Figure 1:
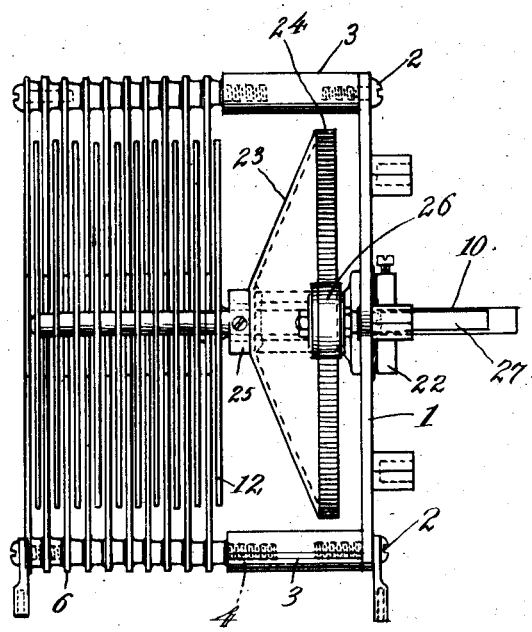

June 24, 1930.   E. J. H. BUSSARD ET AL   1,767,509
VARIABLE CONDENSER
Filed April 8, 1925   2 Sheets-Sheet 1

INVENTORS
Emmery J H Bussard
Charles E. Kilgour
BY
Allen T Allen
ATTORNEYS.

June 24, 1930.   E. J. H. BUSSARD ET AL   1,767,509
VARIABLE CONDENSER
Filed April 8, 1925   2 Sheets-Sheet 2
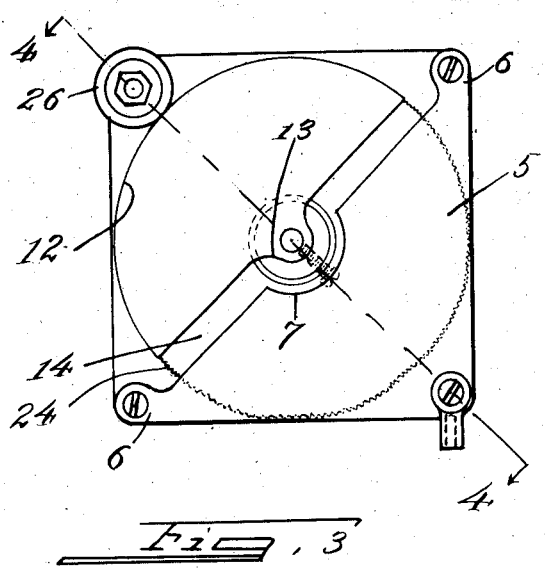
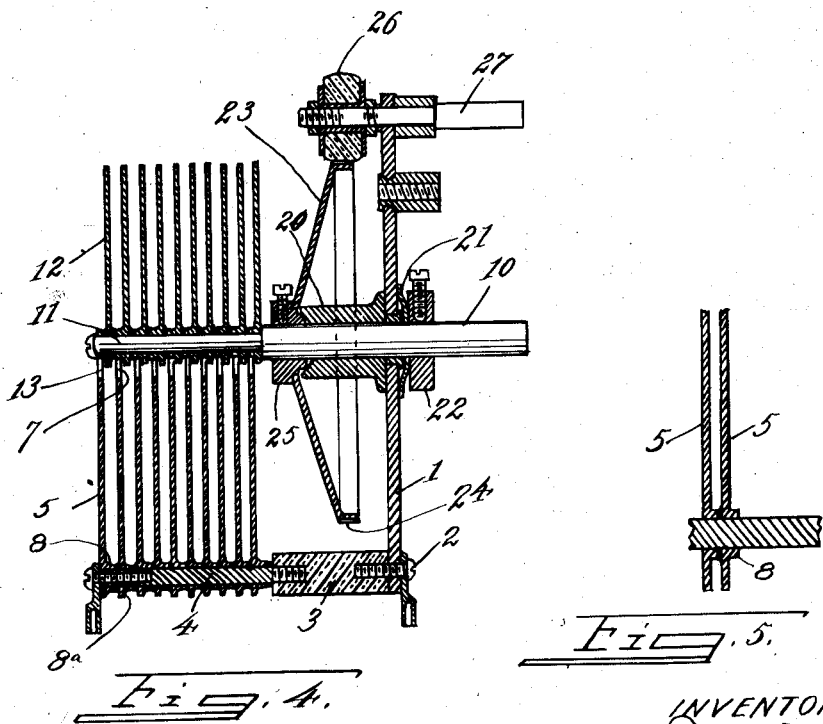
INVENTORS
Emmery J. H. Bussard
Charles E. Kilgour
BY
ATTORNEYS.

Patented June 24, 1930

1,767,509

UNITED STATES PATENT OFFICE

EMMERY J. H. BUSSARD AND CHARLES E. KILGOUR, OF CINCINNATI, OHIO, ASSIGNORS TO THE CROSLEY RADIO CORPORATION, OF CINCINNATI, OHIO, A CORPORATION OF OHIO

VARIABLE CONDENSER

Application filed April 8, 1925. Serial No. 21,672.

Our invention relates to variable condensers such as are used in radio receiving devices, same being of the air spaced, rotor type, with grounded base and rotor.

In condensers with the parts thereof mounted on a grounded base, it is essential to provide a mounting for the fixed plates which is well and adequately insulated from the base. In this connection it is our object to employ a small amount of di-electric material, of small cross section, but so arranged as to give a very long resistance path.

In mounting the stator plates of our condenser we have the supports so arranged that the plates can be spaced and held in a jig, with the metal around the mounting post holes flanged down to act as a spacer and support, and then the assembly can be soldered onto the posts, thereby giving a very rigid connection of very low resistance, and tight bond.

It is our object to provide a mounting and structure of a vernier member for operating the rotor element, which brings the application of force down very low, thereby permitting a long bearing, but an operation which does not cause a deflection of the rotor, thus varying its action.

Also the support of the grounded rotor contains improved structural features tending to hold it in rigid alignment and making its movement regular.

Finally in design of the stator plates and rotor plates, we have provided for a relation of parts which permits of a very full and complete movement of the rotor plates away from the stator plates, with the rotor plates at no point approaching nearer to the corners of the stator plates, than at other points. This prevents humps in capacity, which develop in other designs having rotor plates which swing entirely outside of position between the stator plates.

These various features of advantage we accomplish by that certain construction and arrangement of parts to be hereinafter more specifically pointed out and claimed.

Figure 2:
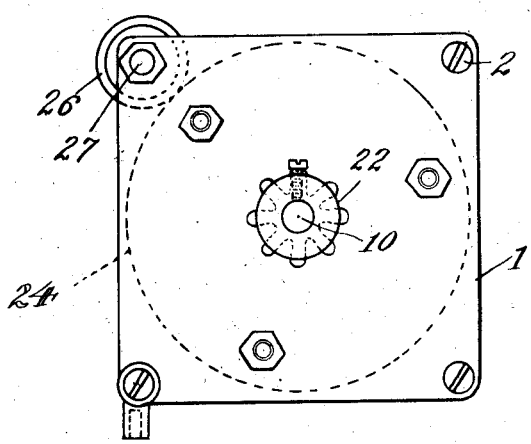

In the drawings:

Figure 1 is a side elevation of the device.
Figure 2 is an end plan view thereof.
Figure 3 is the other end plan view thereof.
Figure 4 is a section on the line 4—4 of Figure 3.
Figure 5 is a detail section illustrating the plate mounting.

Referring first to the mounting of the fixed plates, we show as a base plate 1, which may be part of a grounded plate of a radio receiving instrument, or as a separate plate, as shown, may be mounted on the panel of any radio instrument.

Set on the base and held by screws 2 are, in this instance three posts 3, formed of dielectric material, into which the screws 2 penetrate only a short distance. Set into the tops of these dielectric posts are posts 4 of conductive material, which may be threaded into short holes in the tops of the posts. The stator plates 5 of the condenser are formed with corner ears 6, and are triangular in shape otherwise except for a cut-away portion 7 at the center of their exposed long edges, to give spacing of proper nature to the spindle of the rotor. In the two ears and at the center corner of the fixed plates the metal is formed down into flanges 8, leaving holes for the posts 4. The flanges 8 act as spacers between the plates and help to support them upon each other and form a body for receiving solder. The plates are assembled in a jig, giving them fixed spacing, the posts set into the holes and solder 8ª is then applied to the posts permanently uniting the plates in fixed properly spaced position. This operation is very simple, and in addition forms a very good bond between the plates.

The shortest path for escape of potential is through the posts of dielectric material, from the tips of the ends of the posts 4 to the tips of the mounting screws 2. The resistance across this gap is extremely high, resulting in practically no loss whatever in our device, since not only is the path long, but the elements forming the shortest path are of quite restricted area.

The rotor spindle indicated at 10, is mounted in the base and has at its upper portion a plate mounting post 11, on which the rotor plates 12 are mounted in the same manner as the fixed plates. The rotor plates have circular edges formed on a radius from the mounting spindle and post and when fully interlying the stator plates, the planes of the edges of both sets of plates are coincident, except for the central ears 13 on the plates which are punched and flanged to engage over the post 11, and except for the notches and ears on the stator plates.

When the rotor is revolved to bring the rotor plates outside of the zone of the stator plates, the space 14 between the planes of the adjacent edges of the sets of plates is of almost exactly equal width entirely across the assembly. Furthermore upon movement of the rotor, the advancing edges of the rotor plates both the straight edges and the curved edges, never approach the fixed plates at a shorter spacing than the space 14, because the ears on the fixed plates bring the mounting posts thereof to a point on a circle of greater radius than that of the circular edges of the rotor plates with relation to the spindle thereof.

This feature prevents humps in capacity of the condenser when in its open positions, and is a decided improvement over rotary condensers bordering on this design which have been used in the past.

The method of operating the rotor spindle and mounting it results particularly in permitting a long spindle, with a vernier operation in which the force is applied near the journal, in order to avoid tendency of tipping the spindle.

We have indicated the spindle as housed in a thimble 20, which rests on the base 1, and may be permanently secured thereto. The spindle passes down through the base 1, where it has mounted over it a loose spring washer 21. A collar with set screw indicated at 22, engages over the spindle and presses up on the spring washer. A conical metal plate or apron 23 is provided having a knurled edge 24, and provided with a collar 25 to engage over the spindle. This collar 25 has a set screw to engage the rotor spindle.

By releasing the two collars the spindle may be adjusted in position, and the collars then forced toward each other which holds the spindle under spring tension from the washer, making its rotation steady and applying a uniform friction, against irregular motion, by means of the spring washer, which normally does not revolve, but bears against the lower collar and the base plate.

A rubber roller 26 mounted on a spindle 27 bears against the knurled edge of the conical apron 23, and rotation of the spindle 27 will revolve the apron, and the rotor of the device. The line of force as applied to the spindle is on the plane of the rubber roller and hence permits the long spindle, with its concomitant feature of long spacing in the dielectric posts on which the fixed plates of the condenser are placed.

We have described a specific embodiment of our invention above as an example of our invention, and will proceed in our claims to indicate the patentable novelty which we believe to be inherent therein.

Having thus described our invention, what we claim as new and desire to secure by Letters Patent, is:—

1. In a variable interlocking plate air condenser in combination with a plate supporting the condenser in which plate the rotor spindle is journaled, vernier actuating mechanism for rotating the rotor spindle comprising a driving portion near the plane of the supporting plate and driven portions near the plane of the rotor plates, whereby a long bearing may be employed.

2. In a variable interlocking plate air condenser in combination with a plate supporting the condenser in which plate the rotor spindle is journaled, vernier actuating mechanism for rotating the rotor spindle comprising a driving portion near the plane of the supporting plate and driven portions near the plane of the rotor plates, whereby a long bearing may be employed, said driving and driven portions being composed of a hollow conical member driven at its periphery and secured to the rotor spindle adjacent the apex of said conical member.

3. In a variable interlocking plate air condenser, a plate supporting said condenser, a stator plate assembly mounted on said supporting plate but out of electrical contact therewith, a rotor plate assembly mounted on a spindle, said spindle journalled in a single bearing centrally of said plate, and actuating means for said rotor spindle comprising a vernier driving means journalled in said supporting plate and adjacent thereto, and driven means on said spindle comprising a portion for contacting said vernier driving means, located adjacent said supporting plate, and a portion for contacting said spindle located at a further distance from said supporting plate, whereby a long bearing for said spindle may be accommodated, and a second bearing made unnecessary.

4. In a variable interlocking plate air condenser, a plate supporting said condenser, a sleeve bearing mounted on said plate and of sufficient length to journal a spindle for the rotor plate assembly in fixed relationship to a stator plate assembly also mounted on said supporting plate, a spindle in said bearing, a rotor plate assembly on said spindle, and a driving means for said spindle comprising an attachment portion on said spindle on the side of said bearing furthest from said supporting plate, a drive portion approaching said supporting plate and driving means in proximity to said supporting plate, said driving means being located between said supporting plate and said interlocking plate condenser.

5. In a variable interlocking plate air condenser, a plate supporting said condenser, a bearing mounted on said plate and of sufficient length to hold a spindle bearing a rotor plate assembly in fixed relationship to a stator plate assembly mounted on said supporting plate, a spindle carrying a rotor plate assembly mounted in said bearing and driving means for said spindle comprising a conical drive portion fitting over said bearing and having an outer rim approaching said supporting plate, a vernier driving means on said supporting plate contacting said rim.

6. In a variable interlocking plate air condenser, a plate supporting said condenser, a bearing mounted on said plate and of sufficient length to hold a spindle bearing a rotor plate assembly in fixed relationship to a stator plate assembly mounted on said supporting plate, a spindle carrying a rotor plate assembly mounted in said bearing and driving means for said spindle comprising a conical drive portion fitting over said bearing and having an outer rim approaching said supporting plate, a vernier driving means on said supporting plate contacting said rim, said spindle held in said bearing by adjustable sleeve portions on either side thereof.

EMMERY J. H. BUSSARD.
CHARLES E. KILGOUR.